United States Patent [19]

Boettinger

[11] Patent Number: 4,847,741

[45] Date of Patent: Jul. 11, 1989

[54] LIGHT POLE PLANTER DEVICE

[76] Inventor: Paul W. Boettinger, 202 N. Beechwood Ave., Catonsville, Md. 21228

[21] Appl. No.: 189,795

[22] Filed: May 3, 1988

[51] Int. Cl.$^4$ .................................................. F21S 1/10
[52] U.S. Cl. .................................... 362/431; 362/122; 362/368; 362/805
[58] Field of Search ............... 362/122, 805, 431, 123, 362/430, 368, 250

[56] References Cited

U.S. PATENT DOCUMENTS

| 553,220 | 1/1896 | Buckner | 362/431 |
|---|---|---|---|
| 1,164,211 | 12/1915 | Reed | 362/122 |
| 3,030,735 | 4/1962 | Bodkins | 362/430 |
| 4,225,909 | 9/1980 | Scholz et al. | 362/431 |
| 4,232,362 | 11/1980 | Williams et al. | 362/122 |
| 4,389,699 | 6/1983 | Qualls | 362/250 |
| 4,441,145 | 4/1984 | Antkowiak . | |
| 4,569,008 | 2/1986 | Creaser | 362/368 |
| 4,590,543 | 5/1986 | Chen | 362/368 |
| 4,594,646 | 6/1986 | Kohorn . | |
| 4,626,968 | 12/1986 | Kohorn . | |
| 4,646,209 | 2/1987 | Jansen . | |
| 4,686,611 | 8/1987 | Kohorn . | |

Primary Examiner—Ira S. Lazarus
Assistant Examiner—Sue Hagarman
Attorney, Agent, or Firm—Leon Gilden

[57] ABSTRACT

A light pole planter arrangement is set forth wherein a plurality of mirror image shells are arranged for 180 degree containment about an associated light pole such that when the shells are secured together about the light pole, various plants and the like are positionable therein for a novel enhancement of the associated light pole. Each shell is formed with a continuous elongate seal extending along terminal end faces of each shell and continuing about an upper portion of a serrated semicircular opening within each shell wherein each serrated opening enables a frictional non-slip engagement with the light pole planter device in association with the light pole. Offset tabs are positioned extending outwardly of each end surface of the device for enhancement of the association of the two shells to effect a non-slip arrangement of one shell with respect to the other.

2 Claims, 3 Drawing Sheets

LIGHT POLE PLANTER DEVICE

BACKGROUND OF THE INVENTION

1. Field of the Invention

The field of invention relates to lighting apparatus and more particularly pertains to a new and improved lighting apparatus including a plant holder arrangement for securement to a cylindrical light pole in a sealing relationship thereto.

2. Description of the Prior Art

The use of lighting devices in association with plants is well known in the prior art for the soothing and aesthetic effect it produces. Typically, however, the combination of plants with illumination devices has required the need for elaborate and expansive structural organizations to interrelate plant growth and illumination wherein a typical plant has been remotely oriented relative to a lighting organization due to the non-analogous structural requirements of each. The present invention overcomes the deficiencies of the prior art by providing a readily associatable plant holder for securement about a typical light pole.

Examples of prior art devices that have been utilized to associate lighting devices and plant holding arrangements may be found typically in U.S. Pat. No. 4,441,145 to Antkowiak wherein the lighting arrangement has included a high intensity light positioned and arranged over a plant that included a cyclic drive means to maneuver the light over the plant to provide illumination to the various plants. The patent is typical of the prior art devices combining plants and lighting arrangements wherein the two entities are remotely oriented relative to one another.

U.S. Pat. No. 4,626,968 to Kohorn sets forth a lighting arrangement for the lighting of plants wherein a light is directed upwardly through a transparent area and water-tight housing wherein plants are positioned overlying the housing to effective a glare-free viewing arrangement by observers thereof.

U.S. Pat. No. 4,646,209 to Paul Jansen sets forth an illuminated plant holder wherein an underlying support forms a bulb securement means and provides an overlying holder wherein illumination from within the transition support is arrayed within an outer wall to minimize shadows directed from said support.

U.S. Pat. No. 4,686,611 to Kohorn provides a plant support wherein a light is positioned within said support formed with a compartmentalized grill to direct the light upwardly and provide a glare-free light source for viewing by observers.

U.S. Pat. No. 4,594,646 to Kohorn sets forth a plant holder for positioning within the earth for containment of an underlying bulb positioned under an associated plant to provide glare-free viewing of the plant.

As such, it may be appreciated, therefore, that there continues to exist a need for a plant holder in association with an illumination source of a universally adaptable nature to enable securement of the device along an associated light pole of conventional construction and as such, the present invention substantially fulfills this need.

SUMMARY OF THE INVENTION

In view of the foregoing disadvantage inherent in the known types of illuminated plant arrangements now present in the prior art, the present invention provides an light pole planter device wherein the same may be efficiently and effectively secured at a selective vertical orientation relative to an existing light pole. As such, the general purpose of the present invention, which will be described subsequently in greater detail, is to provide a new and improved light pole planter device which has all the advantages of the prior art illuminated plant arrangements and none of the disadvantages.

To attain this, the present invention includes a plurality of interengageable shells wherein each shell is securable to the other and each defines 180 degrees of enclosure about an associated light pole. Each shell has integrally formed along confronting faces thereof a continues seal for containing moisture within the device when secured about a light pole. Underlying serrated teeth are circumferentially formed about 180 degrees of arc for frictional engagement of a light pole in a nonslip arrangement.

My invention resides not in any one of these features per se, but rather in the particular combination of all of them herein disclosed and claimed and it is distinguished from the prior art in this particular combination of all of its structures for the functions specified.

There has been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved light pole planter device which has all the advantages of the prior art light pole planter devices and none of the disadvantages.

It is another object of the present invention to provide a new and improved light pole planter device which may be easily and efficiently manufactured and marketed.

It is a further object of the present invention to provide a new and improved light pole planter device which is of a durable and reliable construction.

An even further object of the present invention is to provide a new and improved light pole planter device which is susceptible of a low cost of manufacture with regard to both materials and labor, and which accordingly is then susceptible of low prices of sale to the consuming public, thereby making such light pole planter devices economically available to the buying public.

Still yet another object of the present invention is to provide a new and improved light pole planter device which provides in the apparatuses and methods of the prior art some of the advantages thereof, while simultaneously overcoming some of the disadvantages normally associated therewith.

Still another object of the present invention is to provide a new and improved light pole planter device wherein the same may be positioned at a selective orientation relative to a vertically oriented light light pole, as desired.

Yet another object of the present invention is to provide a new and improved light pole planter device wherein confronting shells define 180 degree enclosures about a light pole wherein when the shells are secured together, a continuous 360 degree planter is arranged about an associated light pole.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
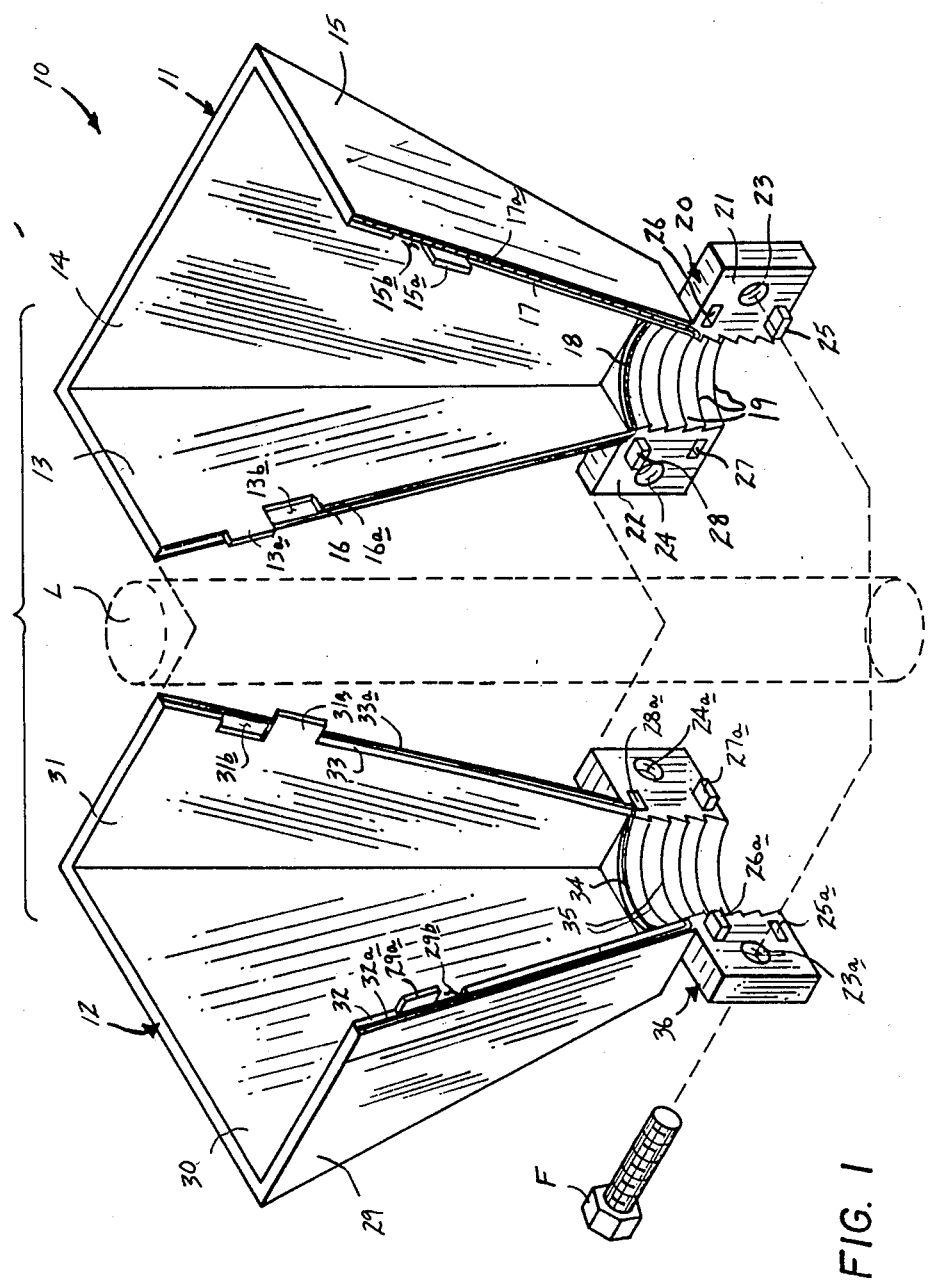
FIG. 1 is an isometric illustration of the instant invention for securement about an associated light pole.

With reference now to the drawings, and in particular to FIGS. 1 to 10 thereof, a new and improved light pole planter device embodying the principles and concepts of the present invention and generally designated by the reference numeral 10 will be described.

More specifically, it will be noted that the light pole planter device 10 essentially comprises a tapered trihedrial first shell 11 mating with a tapered trihedrial second shell 12.

The first shell 11 includes a first trapezoidal side 13 integrally joined to an intermediate second side 14 and to a third trapezoidal side 15 of equal configuration to the first side 13 with the exception of the projecting tabs 13a and 15a respectively that are inversely oriented on the respective sides 13 and 15 relative to respective tab accepting recesses 13b and 15b respectively to accept complementarily shaped tabs 31a and 29a of the second shell 12. The first shell 11 further includes confronting forward edge surfaces designated by the first forward edge surface 16 of the first side 13 and the second forwar edge surface 17 of the second side 15. Integrally secured to the edge surfaces is a continuous seal including a first leg 16a secured to the first edge surface 16 and a second leg 17a secured to the second edge surface 17 with an integrally formed intermediate semi-circular seal 18.

The semi-circular intermediate seal 18 is formed at an upper terminal edge of a semi-cylindrical recess defined by a parallel series of serrated teeth 19 defining 180 degrees of arc formed to a first base 20 of the first shell 11.

The base 20 is formed with a first face 21 and a second face 22 wherein the first face 21 has formed therethrough a threaded first through extending aperture 23 and the second face 22 has formed in aligned vertical relationship to the first aperture 23 a second smooth aperture 24. The second aperture 24 terminates rearwardly of the second face 22 and includes a relief bore 37 for accepting the head of an associated fastener "F" fitting therethrough.

Figure 11:
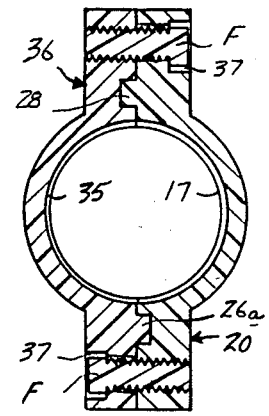
FIG. 11 is an orthographic view taken along the lines 11—11 of FIG. 10 in the direction indication by the arrows.
Figure 10:
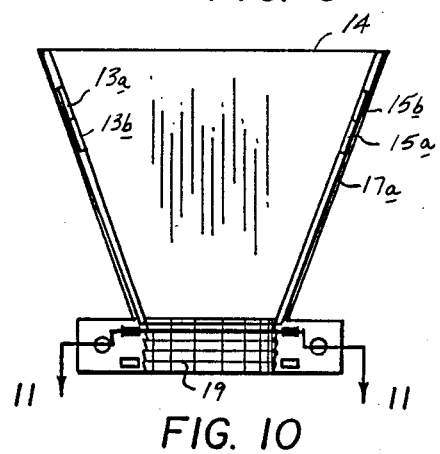
FIG. 10 is an orthographic front view taken in elevation of device as set forth in FIG. 8.

Further formed in the first face 21 is a projecting boss 25 of a rectangular cross-sectional configuration underlying a first recess of complementary cross-sectional configuration to the first boss 25. A second recess of like cross-sectional configuration is oriented on the second face 22 aligned with the first boss 25 and underlying a second boss 28 wherein the various bosses and recesses 25 through 28 are of equal cross-sectional configuration for matingly cooperating with mirror image bosses and recesses 26a, 25a, 28a, and 27a formed on the second base 36 of the second shell 12. A smooth bore 23a and a threaded bore 24a are also found on the second base 36 wherein reference to FIG. 11 illustrates the cooperative engagement of the base 36 with the base 20 to secure the first and second shells 11 and 12 respectively together about an associated light pole "L", illustrated in phantom in FIG. 1. Similarly, the second base 36 is formed with a semi-circular cavity defined by a serrated teeth 35 with a semi-circular seal bounding the upper terminal edge of the recess also defining 180 degrees of arc as does the recess within the first shell 10.

Of mirror image construction to the first shell 11 is a first face 29, a second face 30, and a third face 31 formed with a respective first forward edge surface 32, and a terminating second edge surface 33 including a seal of a first leg 32a and a second leg 33a respectively continuously formed to the semicircular intermediate seal 34.

Projecting tab 29a accordingly interfits with tab recess 15b and tab recess 29b accepts the tab 15a and accordingly, the tab recess 31b accepts the tab 13a and the tab 31a is accepted within the tab recess 13b for the respective shells 12 and 11.

Figure 2:
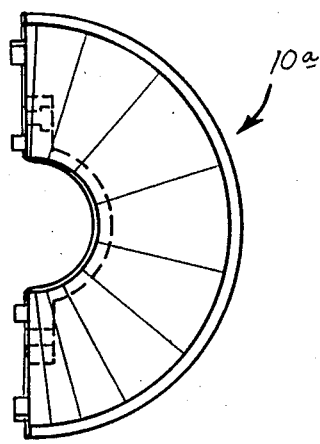
FIG. 2 is a top orthographic view of a semi-circular shell arrangement for securement about a light pole.
Figure 5:
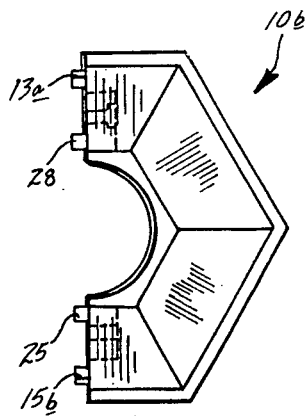
FIG. 5 illustrates a polygonal configuration illustrated in a top orthographic view for securement about an associated light pole.
Figure 3:
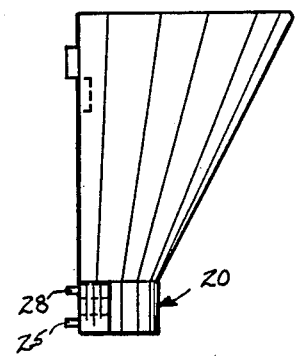
FIG. 3 is an orthographic side view taken in elevation of the device as set forth in FIG. 2.
Figure 6:
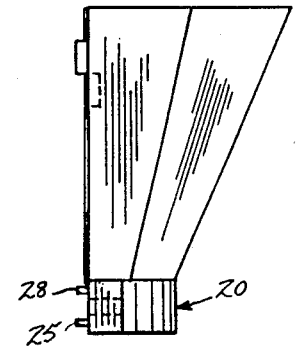
FIG. 6 is an orthographic side view taken in elevation of the device as set forth in FIG. 5.
Figure 4:
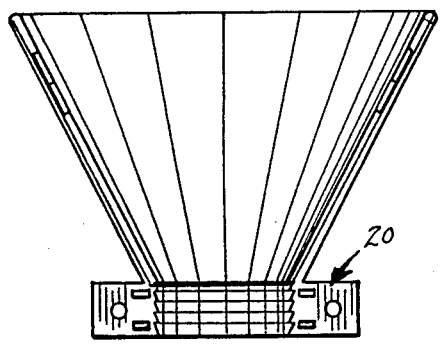
FIG. 4 is an orthographic front view taken in elevation of the device as set forth in FIG. 2.
Figure 7:
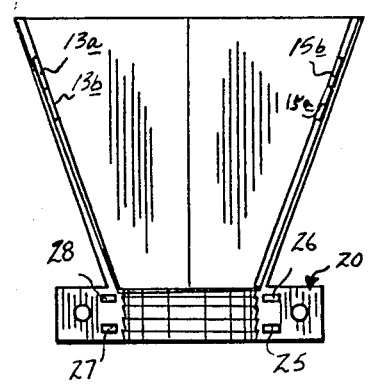
FIG. 7 is a front orthographic view taken in elevation of the device as set forth in FIG. 5.
Figure 8:
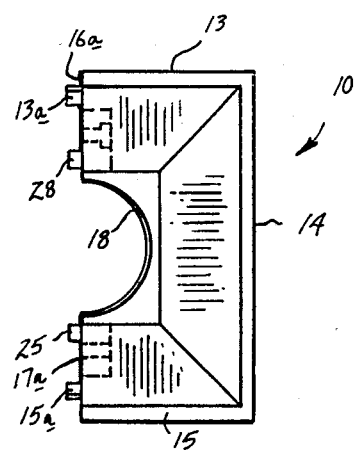
FIG. 8 is a further polygonal configuration for securement about a light pole.
Figure 9:
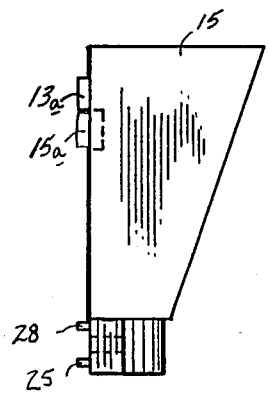
FIG. 9 is an orthographic side view taken in elevation of the device as set forth in FIG. 8.

FIGS. 2 through 4 illustrate the use of a semicircular shell construction 10a with a polyhedral configuration illustrated in FIGS. 5 through 7 of four-sided construction where it should be noted that all of the variations of shell configuration require an upwardly and outwardly tapered shell for containment of a plant therein to direct fluid within said shell for providing moisture to such plants to be directed towards a focal point proximate the respective bases of the shells to enhance plant growth and development.

In use, the light pole planter device is merely positioned, as desired, along the vertical length of a light pole "L" and the various shells are merely positioned thereabout to define 180 degree respective arc about the respective light pole "L" and wherein securement of the device 10 is assured by interengagement of the respective serrated teeth 18 and 35 of the shells 11 and 12 and the associated seals formed on the forward edge surfaces, as described previously, assure a sealing relationship between the two shells to maintain moisture and prevent leakage therefrom.

As such, the usage and operation of the invention should be apparent from the above disclosure and accordingly, no further discussion relative to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A light pole planter device for use in combination with a cylindrical light pole defined about a vertical axle, said device comprising, a first shell means including a first downwardly tapered upper portion integrally formed to a first base means for securement about 180 degrees of arc defined about said cylindrical pole, and a second shell means including a second downwardly tapered upper portion integrally formed to a second base means for securement about 180 degrees of arc about said cylindrical light pole, and said first downwardly tapered upper portion of said first shell means terminating in a first face means defining a first surface parallel to said axis, and said second downwardly tapered upper portion of said second shell means terminating in a second face means defining a second surface parallel to said axis, and interengaging means projecting from said first surface for complementary positioning within recesses in said second surface, and further interengaging means projecting from said second surface for a complementary engagement with recesses in said first surface, and fastening means for securing said first shell means and said second shell means together about said light pole to define a cavity between said first and second shell means about 360 degrees of arc about said light pole, and wherein said first base means includes a first threaded bore and a second non-threaded bore wherein said nonthreaded bore originates from a first surface of said first base means through said first base means to a relief bore formed in a rearward surface of said first base means, and wherein said second base means is formed with a first non-threaded bore in said base means in alignment with said threaded bore in said first base means and a second threaded bore in said second base means in alignment with said non-threaded bore in said first base means, and wherein said first base means includes a plurality of bosses and a plurality of recesses and said second base means includes a further plurality of bosses and a further plurality of recesses for complementary interengagement with said bosses and recesses of said first base means, and wherein said downwardly tapered upper portion includes a plurality of downwardly tapered trapezoidal configurations, and wherein said first base means includes an arcuate recess of complementary configuration to said light pole and formed with a parallel series of serrated teeth for engagement of said light pole and said second base portion is formed with a further arcuate recess with a further series of serrated teeth of complementary configuration with said light pole.

2. A light pole planter device as set forth in claim 1 wherein said first surface includes a continuous resilient seal and said second surface includes a further continuous resilient seal to effect a fluid tight seal about said light pole when said first shell means and said second shell means are secured about said light pole.

* * * * *